March 8, 1960 A. BANNER 2,927,672

AUTOMATICALLY RELEASABLE TORQUE TRANSMITTING APPARATUS

Filed April 15, 1957 4 Sheets-Sheet 1

INVENTOR.
ARTHUR BANNER
BY
Bernard Kriegel
ATTORNEY.

AUTOMATICALLY RELEASABLE TORQUE TRANSMITTING APPARATUS

Filed April 15, 1957 4 Sheets-Sheet 2

INVENTOR.
ARTHUR BANNER
BY
Bernard Kriegel
ATTORNEY

March 8, 1960 A. BANNER 2,927,672

AUTOMATICALLY RELEASABLE TORQUE TRANSMITTING APPARATUS

Filed April 15, 1957 4 Sheets-Sheet 3

INVENTOR.
ARTHUR BANNER
BY
Bernard Kriegel
ATTORNEY.

March 8, 1960 A. BANNER 2,927,672

AUTOMATICALLY RELEASABLE TORQUE TRANSMITTING APPARATUS

Filed April 15, 1957 4 Sheets-Sheet 4

INVENTOR.
ARTHUR BANNER
BY
Bernard Kriegel
ATTORNEY

United States Patent Office 2,927,672

Patented Mar. 8, 1960

2,927,672

AUTOMATICALLY RELEASABLE TORQUE TRANSMITTING APPARATUS

Arthur Banner, Rivera, Calif., assignor of one-half to Henry T. M. Rice, San Gabriel, and one-half to Bernard Kriegel, Los Angeles, Calif.

Application April 15, 1957, Serial No. 652,709

10 Claims. (Cl. 192—56)

The present invention relates to torque transmitting apparatus, and more particularly to apparatus for tightening threaded fastening elements, such as nuts, bolts, and screws, to preselected values.

Power operated apparatus is used for tightening threaded fastening elements to predetermined extents. Some apparatus includes a torque releasable clutch, which releases automatically when a predetermined torque is transmitted through it. However, variations often appear in the torque to which a threaded fastening element has been tightened from the torque at which the clutch releases. This is due to inertia factors, the inertia of the rotating or moving parts of the apparatus adding to the torque at which the clutch will release to give the total torque to which the fastening element has been tightened. If the fastening element comes to a sudden stop, at which clutch release occurs, the inertia forces are relatively high, and, with a particular clutch release torque setting, the element is tightened to a relatively high value. On the other hand, if the fastening element comes to a relatively slow or gradual stop before the clutch releases, the inertia forces are much lower, and so is the torque to which the fastening element is tightened, despite the fact that the clutch release occurs at the same torque value as before.

It is evident that, with the same torque setting at which clutch release occurs, the same apparatus will tighten threaded fastening elements to different degrees, depending upon the gradual or sudden stopping of the fastening elements.

It is, accordingly, an object of the present invention to provide releasable torque transmitting apparatus for tightening threaded fastening elements which automatically compensates for variations in inertia forces to which the apparatus is subjected, thereby insuring release of the apparatus with the threaded fastening element tightened to the same torque value in situations where the threaded fastening element comes to a sudden stop, as when it comes to a relatively gradual stop.

Another object of the invention is to provide releasable torque transmitting clutch apparatus in which friction in the clutch is minimized considerably, the clutch being capable of automatically compensating for variations in inertia forces to which it is subjected, to secure the desired clutch release when the threaded fastening element has been tightened to a predetermined degree, regardless of the rapidity with which the fastening element comes to a stop.

A further object of the invention is to provide releasable torque transmitting clutch apparatus embodying clutch teeth and intervening rollable elements to minimize friction, the clutch teeth being shaped to compensate for variations in inertia forces to which the clutch is subjected, so that clutch release occurs when the threaded fastening element has been tightened to a preselected extent. The clutch teeth employed in accomplishing the above stated purpose have a shape that is relatively easy and economical to manufacture with a high degree of accuracy.

Yet another object of the invention is to provide releasable torque transmitting apparatus particularly adapted for tightening threaded fastening elements and embodying clutch teeth driving through intervening rollable elements, in which the torque required to loosen a fastening element is greater than the torque to which the same apparatus will tighten the element for the same clutch release setting of the apparatus.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

Figure 2:
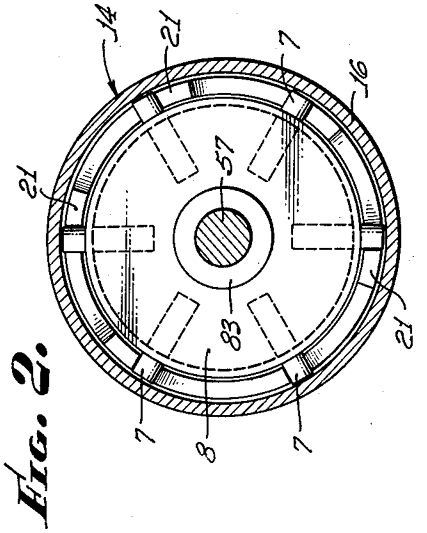
Fig. 2 is a cross-section taken along the line 2—2 on Fig. 1.
Figure 6:
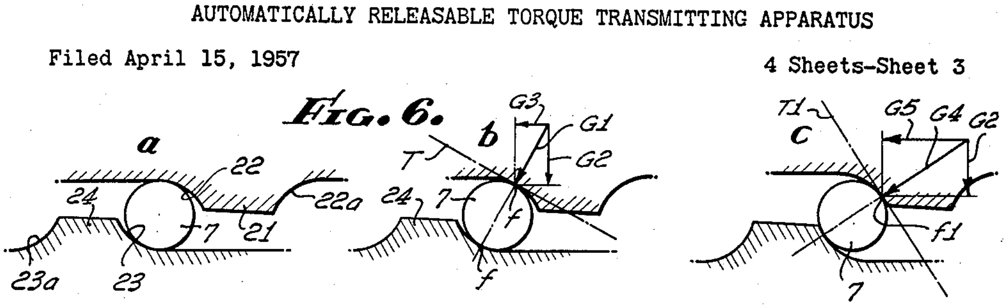
Figure 7:
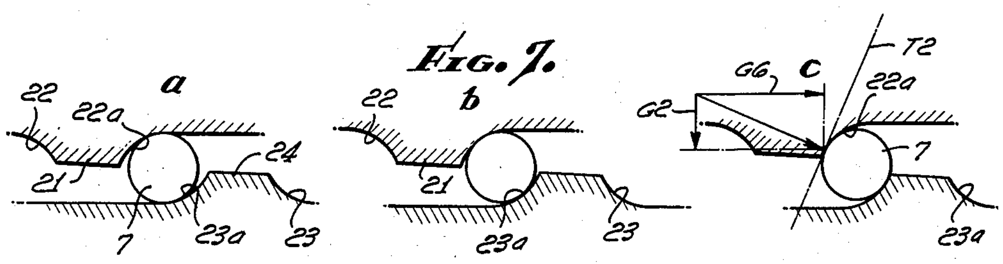
Figure 8:
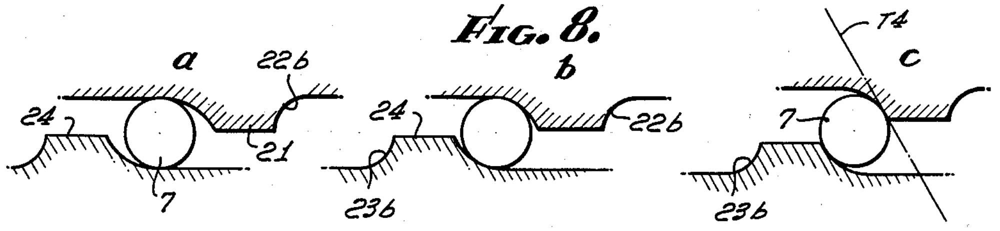
Figure 9:
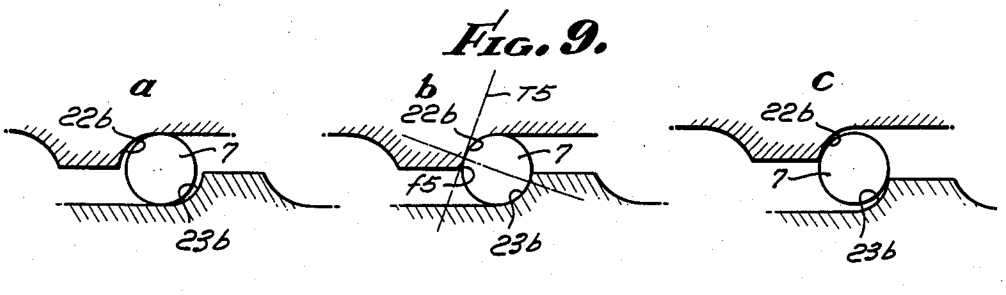
Figure 10:
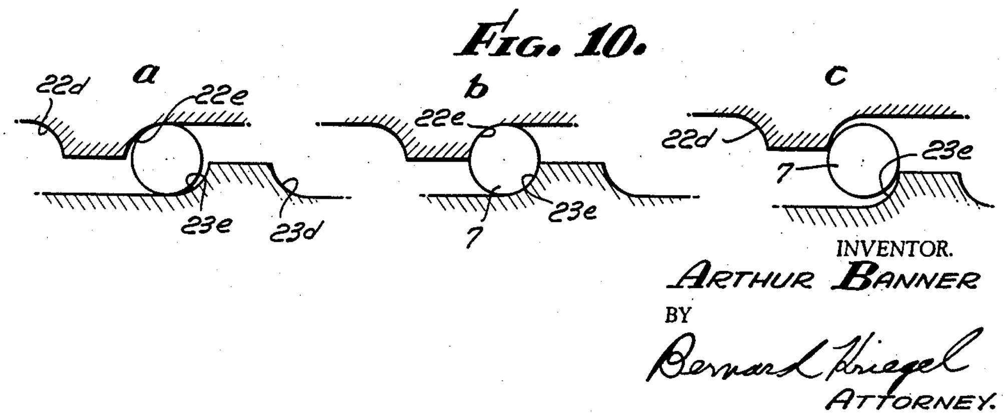
Figure 11:
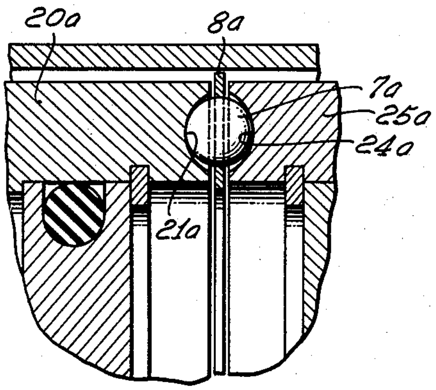
Figure 13:
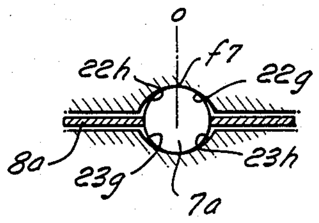
Figure 14:
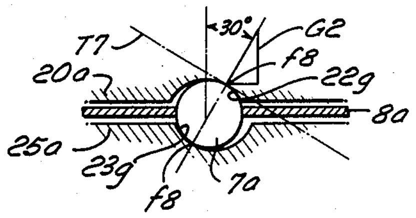
Figure 12:
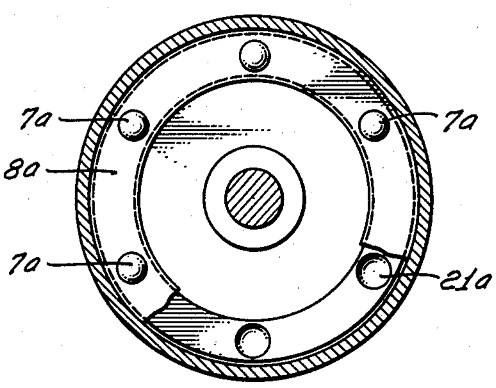
Figure 15:
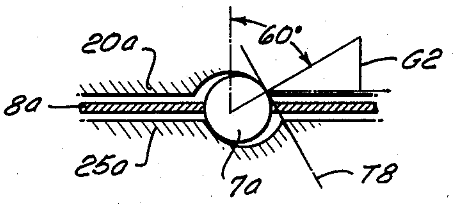
Figure 16:
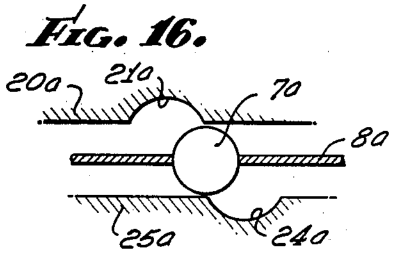

Figs. 6–*a, b, c* represent diagrammatic views of one form of primary clutch, with the parts in different relative positions when the clutch operates in the normal or forward driving direction;

Figs. 7–*a, b, c* represent views similar to Fig. 6, showing the different positions of the clutch when operating in the reverse direction;

Figs. 8–*a, b, c* represent views of another specific form of primary clutch structure, showing the different positions it occupies when operating in a forward or normal driving direction;

Figs. 9–*a, b, c* represent views corresponding to Fig. 8, illustrating the clutch apparatus in different positions when operating in a reverse direction;

Figs. 10–*a, b, c* represent diagrammatic views of still another form of clutch structure in different positions of operation;

Fig. 11 is an enlarged fragmentary longitudinal section of a modified form of primary clutch;

Fig. 12 is a cross-section on a reduced scale through the primary clutch shown in Fig. 11 and corresponding to Fig. 2;

Fig. 13 is a diagrammatic view of the clutch device shown in Fig. 11 in one position of operation;

Fig. 14 is a view similar to Fig. 13 illustrating the clutch in another operative position;

Fig. 15 is a view similar to Fig. 13 illustrating the clutch in still another operating position;

Fig. 16 is a view similar to Fig. 13 illustrating the clutch in a released position.

The apparatus illustrated in the drawings has been designed primarily for rotating and tightening a threaded fastening element (not shown), such as a nut or screw. Only the torque releasable portion of the apparatus is illustrated for purposes of simplicity, although the apparatus will normally be associated with a suitable prime mover (not shown) for effecting its rotation. The prime mover rotates a drive shaft 10, either directly or indirectly (as through reduction gearing), which transmits its motion through a torque releasable primary clutch 11, from where the rotary motion is transmitted through a secondary clutch 12 to a spindle 13 to which a suitable tool (not shown), such as a socket wrench or screw driver, is secured, the latter being applicable to the threaded fastening element.

The apparatus is contained within a suitable housing or casing 14, which includes a forward portion or section 15 in which the spindle 13 is rotatably mounted, that is threadedly secured within the forward end of an intermediate housing section 16, which is, in turn, threadedly secured within a rearward housing section 17 having a transverse wall 18 in which the drive shaft 10 is rotatably mounted, this drive shaft being carried by the housing section through a suitable ball or other anti-friction bearing 19.

The drive shaft 10 is integral with, or otherwise suitably secured to, the driving member 20 of the primary clutch 11, which has axially extending clutch teeth 21 provided with concave, cam type of driving faces 22, 22*a* engaging rollable elements or rollers 7, which, in turn, engage concave, cam type of faces 23, 23*a* on driven clutch teeth 24 on the driven member 25 of the primary clutch. The rollers 7 are radial of and rotatably mounted in a carrier 8, the rollers being prevented from shifting out of the carrier by a ring 9 encompassing the carrier 8 and fitting partly in peripheral grooves 9*a* in the rollers. The rotation of the driven member 25 is imparted to the driving member 26 of the secondary clutch 12 through a slidable spline connection. As shown, this spline connection includes opposed longitudinal grooves 27 provided within the driven member 25 and the driving member 26 of the secondary clutch, which receives one or a plurality of ball elements 28 therewithin that, in effect, function as rollable keys serving to transmit the rotation of the driven member to the secondary driving member, while allowing the driven member 25 to shift axially along the driving member 26. The balls 28 are prevented from dropping out of the longitudinal grooves 27 by split snap rings 29 located within grooves 30 at the rear end portion of the secondary clutch driving member and also in the forward portion of the primary clutch driven member 25.

The secondary clutch driving member 26 is rotatably mounted within the forward portion of the intermediate housing section 16 through the agency of a ball bearing 31, which serves to transmit radial loads between the secondary driving member and the housing member, as well as to resist axial displacement of the secondary driving member. This driving member 26 of the secondary clutch has a plurality, such as a pair, of diametrically opposed clutch teeth or lugs 32 engageable with a transverse pin 33 extending through a transverse and elongate slot 34 formed through the rearward portion of the spindle or driven member 13 of the secondary clutch, which is both rotatably mounted and axially movable within the forward housing section 15. This pin 33 may be of square or rectangular cross-section, and will transmit the rotation of the driving member 26 of the secondary clutch to the spindle 13. The transverse pin or clutch element 33 projects in opposite directions through a guide and latch sleeve 35 slidable on the spindle 13, this guide and latch sleeve preventing tilting or rocking of the transverse pin in the spindle.

The guide and latch sleeve 35 and the driven clutch pin 33 are normally urged in a rearward direction, to tend to hold the pin in engagement with the secondary clutch driving teeth 32, by a helical spring 36 disposed in the spindle and bearing upon the pin. When the spindle 13 is urged rearwardly in the housing 14, the rearward force is transmitted through the spring 36 to the pin 33, urging the latter toward engagement with the primary clutch teeth 32 and tending to maintain such engagement. When the pin 33 is fully engaged with the clutch teeth, the rearward end of the spindle slot 34 may be spaced away from the pin, to prevent the spindle from interfering with full engagement of the pin with the teeth 32 under the influence of the spring 36.

The spindle 13 is urged in the opposite direction to disconnect the pin 33 from the secondary clutch teeth 32 by a disengaging spring 37. The helical disengaging spring bears against an inner spindle member 38 to urge the latter in a forward direction and cause its end to engage a transverse disc 39 which, in turn, engages a shoulder or base portion 40 of an enlarged bore 41 formed in the spindle itself. The helical spring 37 acts through the spindle member 38 and the disc 39 to urge the secondary clutch driven member or spindle 13 in an outward or forward direction.

The forward movement of the spindle 13 will cause the rear end of the spindle slot 34 to engage the clutch pin 33 and carry it, together with the guide sleeve 35, in a forward direction, until the pin is completely out of engagement with the secondary clutch driving teeth 32. When this occurs, a peripheral groove 42 in the guide sleeve is disposed opposite one or more detents 43 slidably mounted in the forward housing section 15, each detent device including a helical spring 44 disposed within the detent and urging it toward the groove 42, the outer portion of each spring engaging a retaining sleeve 45 disposed around the housing section 15 and having a flange 46 secured to the housing section by a contractible split snap ring 47 received within a peripheral groove 48 in the forward housing section. When the guide sleeve groove 42 is disposed opposite the detents 43, the springs 44 will force the latter partially into the groove 42 and hold the sleeve 35 and the clutch pin 33 in a clutch releasing or disconnected position.

The tool (not shown), such as the socket wrench or screw driver bit, is insertable within the forward spindle socket 49, being retained in appropriate position by a detent ball 50 in the spindle wall which is urged in an inward direction by a split band spring 51 encompassing the spindle. When the tool is inserted in the spindle socket 49, the ball 50 is urged in an outward direction within a housing extension recess 52, until a companion groove or recess in the tool (not shown) is opposite the detent ball 50, which then is forced by the spring 51 into such recess, to hold the tool in place.

The rotation of the driving member 20 of the primary clutch 11 is transmitted to the driven member 25 through the coengaging cam type of clutch elements 21, 7, 24. The torque being transmitted through these elements tends to shift the driven member 25 axially away from the driving member 20, to disengage the clutch elements, because of the slope of the teeth cam faces 22, 23. The driven clutch teeth 24 are held in engagement with the rollers 7 and the rollers in engagement with the driving teeth 21 against the disengaging force associated with the transmitted torque by an air, or similar, fluid pressure differential device. Thus, a plate 53 is secured against axial movement with respect to the driven member of the primary clutch by bearing against a shoulder 54 on the driven member, being retained in this position by a suitable split snap ring 55 disposed in a groove 56 in the driven member 25.

A valve stem 57 is attached to this plate by split retaining rings 58 located on opposite sides of the plate and disposed in peripheral grooves 59 in the valve stem. The valve stem extends through a forward end closure member or plate 60, which forms part of the valve body portion of the driving member, and which has a hub portion 83 on which the carrier 8 is rotatably mounted. The end closure is secured to the driving member 20 by engaging a shoulder 61 on the latter, being retained thereagainst by a split snap retaining ring 62 disposed in a groove 63 in the driving member. The rearward end of the stem 57 is secured to, or is integral with, a valve head 64 adapted to move in a forward direction into engagement with an end wall 65 of the driving member 20, to dispose a peripheral seal ring 66, carried in a peripheral groove 67 on the valve head, in engagement with a companion cylindrical seat 68 provided on the driving member valve body.

The holding force for maintaining the driven clutch teeth 24, rollers 7 and the driving clutch teeth 21 in engagement with one another is provided by causing fluid under pressure, such as air, to act on the forward face 69 of the valve head 64, which urges it into engagment with the end wall 65 of the valve body, with its seal ring 66 in engagement with its companion seat 68. Air from a suitable source and under pressure flows through an inlet line 70 connected to the rearward housing section 17, this air passing through a choke orifice 71 provided in an orifice plate 72 clamped in the housing wall 18, and thence into a transverse passage 73 in the wall 18, which opens into a peripheral groove 74 on the drive shaft 10. Leakage of fluid along the orifice plate 72 is prevented by rubber or rubber-like gasket rings 75 on its opposite sides clamped thereagainst by the wall 18 and the inlet line 70. Opposed seal rings 76, such as rubber or rubber-like O rings, are located in peripheral grooves 77 on the drive shaft 10 on opposite sides of the peripheral air inlet groove 74, which seal rings rotatably and sealingly engage the wall of the bore 78 in the housing wall 18 through which the drive shaft extends to prevent compressed air leakage along the shaft.

From the peripheral groove 74 the air flows through a tortuous inlet passage 79 in the driving member 20 that opens into the chamber 80 of its valve body portion rearwardly of the valve body closure member 60. Leakage of fluid around the closure member 60 is prevented by a suitable seal ring 81, such as a rubber or rubber-like O ring, disposed in a peripheral groove 82 in the closure member and engaging the inner wall of the driving clutch member 20. The valve stem or rod 57 makes a sufficient close fit with the hub 83 of the closure member as to preclude any substantial leakage therealong from the chamber 80.

Leakage of air in a rearward direction from the chamber 80 is prevented whenever the valve head 64 engages the end wall 65 of the driving member or valve body 20, with the seal ring 66 engaged with the seat 68. However, when the valve head is shifted in the forward direction to disengage the seal ring from the seat, air can then flow around the valve head 64 to its rear portion, passing out of the chamber through an outlet port 85 and into the interior of the housing 14, then flowing around the driving and driven clutch members 20, 25 and exhausting from the housing through a suitable outlet port or ports 86.

The extent of movement of the valve head 64 and its seal ring 66 along the cylindrical seat 68, to secure disengagement of the seal ring from the seat, is preferably a substantial amount, as explained hereinafter. When moved sufficiently in a forward direction, the valve head 64 will disengage the seal ring from the seat, and then allow the air in the chamber 80 and acting on the forward face 69 of the head to pass around the head to its rearward face 87, thereby equalizing the pressure on both sides of the head and effectively nullifying the force of the air pressure tending to hold the valve head 64 with its seal ring 66 engaged with the seat 68, this force having also been exerted on the driven member 25 and tending to hold its teeth 24 engaged with the driving member clutch teeth 21.

As stated above, when the valve head 64 is shifted forwardly from its seat 68 by the driven member 25, the air pressure equalizes on both sides of the head, and it can also exhaust from the valve body through the outlet openings 85, 86. Although air can exhaust through the outlet openings or ports, very little air is lost from the chamber 80, despite its continuous supply through the inlet line 70, since the area of the orifice 71 is comparatively small, and will only allow air at a relatively low rate to pass into and through the various passages 73, 79 to the chamber 80.

When the primary clutch 11 is engaged, with the valve head 64 engaging the end wall 65 of the valve body, and its seal ring 66 in sealing engagement with its companion seat 68, air under pressure act upon the forward face 69 of the valve head and tends to hold it engaged with its companion seat, also tending to hold the driven clutch teeth 24 in full meshing engagement with the rollers 7, and the rollers fully meshed with the driving clutch teeth 21. When the torque being transmitted is sufficient to overcome the holding force of the air under pressure within the valve body, the cam teeth 21, 24 and rollers 7 shift the driven member 25 in a forward direction to disengage the valve head 64 from the seat 68, 65. The driven member 25 is moved forwardly, its forward motion being limited by a rubber or rubber-like bumper device 87*a* secured to the driven member plate 53 and adapted to engage the rear end of the driving member 26 of the secondary clutch.

The driven member 25 is retained in the above disengaged position by a latch arrangement. The driving member 26 of the secondary clutch has a plurality of circumferentially spaced radial holes 88 therein containing laterally slidable detent members or pins 89 that are engaged by a tapered rearward cam face 90 on a latch sleeve 91 slidable within the driven member 26 of the secondary clutch, and also along the inner spindle member 38. A spring 92 constantly urges the latch sleeve 91 in a rearward direction, causing its cam face 90 to tend to shift the latch members or pins 89 in a radial outward direction. However, such shifting cannot occur when the driven clutch member 25 is fully engaged with the rollers 7, and the latter with the driving clutch member 20, since the latch elements 89 then engage an inner cylindrical surface 93 of the driven member.

When the driven member 25 is shifted in a forward direction to clutch disengaging position, an enlarged frusto-conical bore 94 of the driven member is then placed opposite the latch elements 89, allowing the latter to be shifted radially outward by the tapered face 90 of the latch sleeve 91, the latch elements then being in engagement with the divergent surface 94 on the driven member 25, and also with the tapered surface 90 of the latch member 91. Any tendency for the driven member 25 to be reclutched to the rollers 7 and the driving member 20 under the influence of the clutch reengaging spring 37, which engages the inner spindle member 38 and also the forward end of the valve stem 57, is resisted by the fact that the detent elements 89 are engaging both of the tapered surfaces 94, 90 referred to, the angle of taper of such surfaces being such that the detent elements cannot force the latch sleeve 91 in a forward releasing direction against the force of the spring 92, which urges and holds the latch sleeve in a rearward or holding direction.

To release the latch elements 89, it is necessary to shift the secondary clutch pin 33 out of engagement with the driving lugs or teeth 32 of the secondary clutch 12. So long as the secondary clutch is engaged, the driven member 25 of the primary clutch is held in its released position. The secondary clutch is maintained in engagement so long as an endwise, inwardly directed force is being exerted on the spindle 13, as when it is applied against a threaded fastening element. When the endwise force on the spindle 13 is removed, the spring 37 acts through the inner spindle member 38 to shift the spindle 13 forwardly to a position in which the guide sleeve 35 and secondary clutch pin 33 are held in a forward position by the detents 43 entering the sleeve groove 42, which holds the clutch pin 33 out of engagement with the teeth 32 of the secondary clutch driving member. During such forward motion of the spindle 13 under the influence of the spring 37, a flange 96 on the inner spindle member 38 engages an inwardly directed shoulder 97 of the latch sleeve 91, carrying the latter in a forward direction to a position in which its smaller diameter end portion 98 is disposed opposite the latch elements 89, allowing the latter to move inwardly of the driving member 26 of the secondary clutch. When this can occur, the reengaging spring 37 acts through the plate 53 to shift the primary clutch driven member 25 in a rearward direction, as well as the valve stem 57 and valve head 64, reengaging the latter with the end wall 65 of the driving member 20, with the valve seal ring 66 engaging the valve seat 68 and reengaging the driven clutch teeth 24 with the rollers 7 and the latter with the driving clutch teeth 21. During rearward movement of the driven clutch member 25, its divergent surface 94 forces the latch elements 89 inwardly to their initial retracted position entirely within the confines of the periphery of the driving member 26 of the secondary clutch, allowing the inner cylindrical portion 93 of the primary driven clutch member 25 to slide over the latch or detent elements, as disclosed in Fig. 1.

Figure 1:
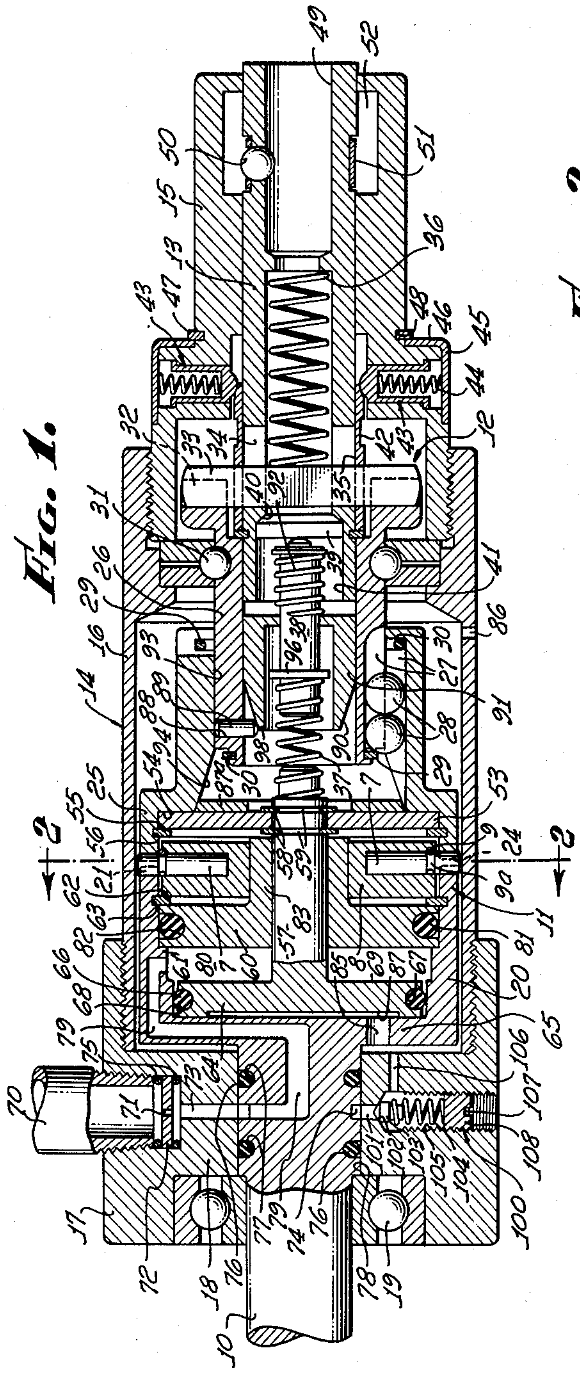
Figure 1 is a longitudinal section through an apparatus embodying the invention, with its primary and secondary clutches both engaged.
Figure 3:
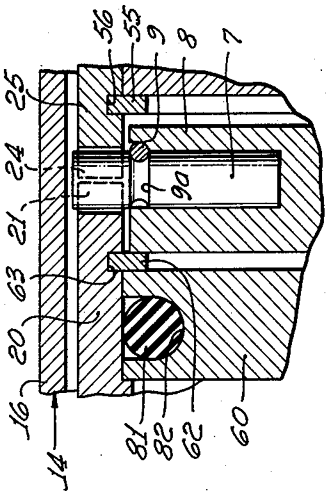
Fig. 3 is an enlarged fragmentary longitudinal section through the primary clutch portion of the apparatus.

In the operation of the apparatus so far described, its parts may be assumed initially to occupy the positions illustrated in Fig. 1, in which the primary and secondary clutches 11, 12 are both engaged. The valve head 64 engages the end wall 65 of the valve body with its seal ring 66 disposed fully within and engaging the valve seat 68. Air under the desired pressure flows through the passages 70, 71, 74, 79 into the valve chamber 80, acting upon the forward face 69 of the valve head and tending to hold the latter and the driven member 25 in a rearward direction to secure the primary clutch 11 in torque transmitting condition. The tool secured to the spindle 13 may be applied to the threaded fastening element and the drive shaft 10 rotated, the rotation being transmitted through the primary clutch driving member 20 and rollers 7 to the driven member 25, and from the driven member through the splines 27, 28 to the driving member 26 of the secondary clutch, from where it passes through the transverse pin 33 to the spindle 13. As the threaded fastening element (such as a nut or screw) is tightened, the torque transmitted increases, this torque acting through the inclined driving clutch teeth 21, rollers 7 and inclined driven teeth 24 and tending to shift the driven clutch member 25 in a forward direction out of engagement from the driving clutch member 20. This action is resisted by the holding force of the air pressure upon the valve head 64. To some, extent, this holding force is also being provided by the clutch reengaging spring 37, but this spring is preferably made comparatively light so that the force is of comparatively minor significance.

When the predetermined force or torque is transmitted, corresponding to the holding force of the air under pressure upon the valve head 64, the driven member 25 is shifted in a forward direction. When shifted sufficiently, the driven member 25 carries the valve head 64 away from the end wall 65 of the valve body and also its seal ring 66 from out of its companion cylindrical seat 68, allowing the air on the forward side of the head to pass around it to its rearward side, equalizing the pressure on the head and reducing the holding force due to the air pressure to substantially zero. Accordingly, the torque transmitted can fully shift the driven member 25 in a forward direction to fully disengaged position under substantially no-load conditions. Of course, the air in the chamber 80 can then exhaust therefrom through the outlet openings 85.

Figures 4, 5:
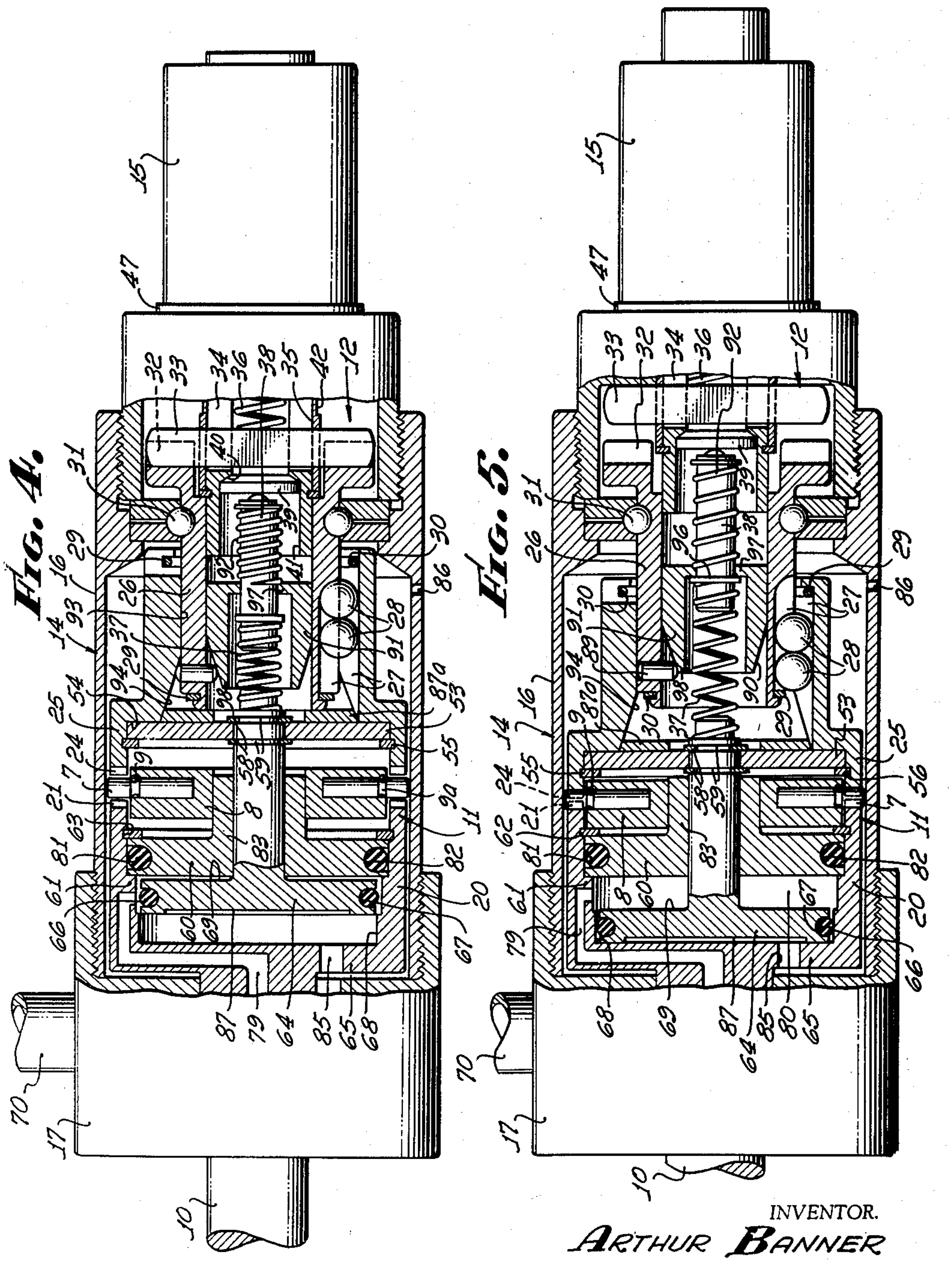
Fig. 4 is a longitudinal section, shown partly in elevation, similar to the view illustrated in Fig. 1, with the primary clutch disengaged and the secondary clutch engaged.
Fig. 5 is a view similar to Fig. 4, with the primary clutch reengaged and the secondary clutch disengaged.

As soon as the divergent surface 94 of the driven member 25 comes opposite the latch elements 89, the spring 92 urges the latch sleeve 91 in a rearward direction, forcing the latch elements outwardly to hold the driven member 25 in disengaged position with respect to the rollers 7 and driving member 20. Accordingly, the drive to the spindle 13 and the tool (not shown) secured therewithin is disrupted. The secondary clutch 12, however, remains in engagement (Fig. 4).

The primary clutch 11 may be reset or reengaged as a result of disengaging the secondary clutch 12. Such disengagement occurs by removing the apparatus from the work, which permits the spring 37 to shift the inner spindle member 38 and the spindle 13 forwardly to a position in which the guide sleeve 35 and secondary clutch pin 33 are held in the forward position by the detents 43 entering the sleeve groove 42, which releasably holds the pin 33 out of engagement from the teeth 32 of the secondary clutch driving member 26. During such forward motion of the spindle 13 under the influence of the spring 37, the spindle member flange 96 engages the latch sleeve 91 and carries it in a forward direction to a position permitting the reengaging spring 37 to shift the primary driven clutch 25 in a rearward direction, to reengage the clutch teeth 21, 24 with the intervening rollers 7 and again place the valve head 64 in engagement with the end wall 65 of the valve body, and with its seal ring 66 disposed within and engaging the cylindrical seat 68, which then closes the chamber 80 against the escape of compressed air through the outlet openings 85, 86 (Fig. 5).

Compressed air can continue to flow into the chamber 80 during the time that the valve head 64 is disengaged from its seat, but very little air will actually be lost from the apparatus, in view of the restriction to air flow imposed by the choke orifice 71 in the orifice plate 72.

Despite the reengagement of the primary clutch 11, no rotation is being imparted to the spindle 13 since the secondary clutch 12 is still disengaged. Upon the application of an endwise force in the rearward direction on the spindle 13, as when the tool connected thereto is applied to a threaded fastening element, its spring 36 will force the sleeve 35 from under the detents 43, then shifting the clutch pin 33 and sleeve 35 rearwardly to a position in which the pin is again engaged with the driving teeth 32 of the secondary clutch. The parts are again in the position disclosed in Fig. 1.

The torque at which the primary clutch 11 will release is dependent upon the air pressure within the chamber 80. Obviously, an increase in the air pressure will increase the force tending to hold the primary clutch engaged, whereas a decrease in this pressure will provide a lesser force holding the clutch teeth and rollers 7 engaged, disengagement of the primary clutch occurring when a lesser torque is transmitted therethrough. In actual practice, the pressure in the inlet line 70 will vary, causing corresponding variations in the pressure in the chamber 80. Accordingly, the apparatus will effect a release of the primary clutch 11 at an improper torque value. By virtue of the arrangement disclosed, fluctuations in the air pressure in the inlet line have no effect whatsoever on the pressure in the chamber 80 and acting on the valve head 64, tending to hold it in its rearward position in the chamber, with the seal ring 66 disposed within and engaged with its companion seat 68.

The air pressure provided in the inlet line 70 is always greater than the air pressure required in the chamber 80. The excess air pressure is relieved from the apparatus by means of a pressure relief valve 100, which, in effect, bleeds the excess air from the apparatus. As disclosed in Fig. 1, the pressure relief valve includes an inlet port 101 communicating with the peripheral groove 74 in the drive shaft 10, which is surrounded by a valve seat 102 adapted to be engaged by a valve head 103, the head being urged toward its valve seat engaging position by a helical compression spring 104 disposed within a transverse bore 105 in the housing section 17, with the inner end of the spring engaging the valve head 103 and its outer end engaging an adjustable spring seat 108 which is threadedly disposed within the bore 105. It is evident that any pressure in the passages 73, 79 and the peripheral groove 74 will act on the valve head 103, tending to urge it in an outward direction away from its seat 102. When shifted from its seat, the air under pressure can then flow around the valve head 103 and exhaust from the pressure relief valve through an outlet passage 106 and into the housing 14 of the apparatus, from where the air can pass to the atmosphere through the outlet port 86.

The spring 104 exerts a certain force on the valve head 103 tending to hold it engaged with its seat 102. The spring seat 108 is appropriately adjusted by threading it in the threaded bore 105, so that the force exerted by the spring 104 on the valve head 103 corresponds to a certain desired pressure which is to be maintained within the pressure chamber 80 of the apparatus. When such pressure is exceeded, the pressure relief or bleeder valve 100 is opened, to allow the air to escape through the exhaust or outlet ports 106, 86 to the atmosphere, thereby maintaining the required pressure in the passages 73, 74, 79 and in the chamber 80. As an example, assume the air pressure in the inlet line 70 to be 100 p.s.i., and a desirability to have an air pressure of only 50 p.s.i. in the chamber 80, tending to hold the valve head 64 in its rearward position, with its seal ring 66 in contact with its companion cylindrical seat 68. The force of the spring 104 will be adjusted so that the relief valve will open when a unit pressure of 50 p.s.i. is exceeded. Inasmuch as the orifice 71 will only allow air under pressure to flow at a rather small rate into the passages 73, 74, 79 of the apparatus, any excess pressure in such passages above 50 p.s.i. will open the bleeder valve 100 and will be reduced. As an example, if the pressure were to tend to become 51 p.s.i. in the passages, the bleeder valve will open and air will be allowed to escape through the pressure relief valve at a sufficient rate as to maintain the pressure in the passages and in the chamber 80 at 50 p.s.i. If the pressure in the passages were to increase further to 60 p.s.i., for example, then the pressure relief valve would open to a much greater extent to allow a greater amount of air to escape through the exhaust ports 106, 86, in order to maintain the pressure in the passages and in the chamber at the desired value, which has been taken by way of example to be 50 p.s.i. The pressure in the passages 73, 74, 79, which are on the outlet side of the orifice 71, will always be less than the pressure in the inlet line 70 on the inlet side of the orifice, the orifice functioning as a throttle to reduce the pressure in the passages.

Accordingly, it is evident that should the air pressure in the inlet line 70 vary, the amount of air allowed to escape by the pressure relief valve 100 will correspondingly vary, maintaining the air pressure in the passages 73, 74, 79 and in the chamber 80 at the desired constant value.

Inasmuch as the pressure in the inlet line 70 is always substantially greater than the pressure in the chamber 80, air will constantly escape through the pressure relief valve 100. However, the loss of air will be very small, in view of the small area through the choke orifice 71. Similarly, as noted above, even when the primary clutch 11 has been released, the air escaping from the chamber 80 through the outlet ports 85, 86 will also be very small in quantity, in view of the small area of the choke orifice.

In the event it is desired to vary the torque at which the primary clutch 11 will release, it is only necessary to either increase or decrease the compressive force of the spring 104 by placing a suitable screw driver in the screw driver slot 107 of the spring seat 108 and turning it within the bore 105 in the desired direction. An increase in the spring force will effect an increase in the constant pressure maintained in the chamber 80, whereas a decrease in the spring force will effect a decrease in the constant air pressure maintained within the chamber. The torque at which primary clutch release will occur in changed in accordance with the force exerted by the air pressure in the chamber 80 on the valve head.

It is to be noted that the cylindrical valve seat 68 is of an extended length, so that the valve head 64 and the driven member 25 attached thereto can move in a forward direction, as to a clutch released condition, to a substantial extent before the valve head 64 and its seal ring 66 will be moved out of sealing relation to the valve seat, which will then permit the air to pass to the rear face 87 of the valve head and also exhaust through the port 85. This arrangement is provided to permit the primary clutch parts to assume different relative axial positions before the holding force tending to maintain the driven clutch member 25 in clutching engagement with the intervening rollers 7 and the latter in clutching relation to the driving clutch teeth 21 has been reduced to substantially zero. In other words, it is desired to maintain the force tending to hold the primary clutch engaged during the initial separating movement between the primary clutch parts.

The radially arranged rollers 7 have a particular radius. The forward driving faces 22, 23 of the driving and driven clutch teeth 21, 24 have a radius of curvature which is greater than the radius of curvature of the rollers, the faces 22, 23 of the driving and driven clutch teeth being concave. With this relationship of parts, a greater torque is required for the same holding force acting on the driven member 25 and the valve head 64 as each roller 7 rides relatively up along the faces 22, 23 of the clutch teeth, as the torque transmitted shifts the driven member 25 in a direction forwardly of the apparatus, or to a clutch releasing position. That this occurs is evident from an inspection of Fig. 6, in which position *a* indicates a substantially no-load torque transmitting condition from a driving clutch tooth 21, through a roller 7, to a driven clutch tooth 24.

As the torque increases, the driven member 25 is shifted axially to a slight extent away from the driving member 21, the roller 7 contacting the driving face 22 of the driving member at the point *f*, and the face 23 of the driven member at the corresponding point *f* (Fig. 6–*b*). The total force being transmitted between the roller 7 and each driving face 22, 23 acts along the line normal to a tangent T drawn to the point of contact *f* between the roller and the face of each clutch tooth, and this force may be represented by the resultant vector G1. The holding force tending to hold the rollers 7 and clutch teeth 21, 24 in engagement with one another is that due to the spring 37 and the air pressure acting on the forward face 69 of the valve head 64. This holding face remains substantially constant, since the air pressure remains constant, the spring 37 preferably only exerting a relatively light force on the parts. This constant holding force acts in a direction parallel to the axis of the apparatus, and may be represented by the vector G2. Accordingly, the torque that must be transmitted through the point of contact *f* between the roller 7 and each clutch face 22 or 23 is represented by the vector G3. This is all depicted in the vector diagram in Fig. 6–*b*, wherein the pressure or force normal to the point of contact *f* must reach the value of G1, and this pressure corresponds to a torque represented by the vector G3, before the holding force G2 will be overcome and relative axial movement take place between each roller 7 and the driving and driven clutch teeth 21, 24 that it engages.

As the torque exceeds the value G3, the driven clutch member 25 is shifted in a forward direction, which produces a relative rolling action of each roller 7 along the companion faces 22, 23 of the driving and driven clutch teeth in a direction toward their outer ends. Assuming that the roller 7 has shifted along the driving clutch face 22 to the position disclosed in Fig. 6–*c*, the roller will be engaging each driving face at a new point of contact *f*1. The same holding force will be exerted on the primary clutch parts to hold them in engagement, since the seal ring 66 is still in sealing engagement with the cylindrical seat 68, so that the air pressure still acts upon the forward face 69 of the valve head 64. This holding force is the same as in the Fig. 6–*b* position, and is represented by the vector G2. The force normal to the tangent T1 drawn to the point of contact *f1* must then amount to the value G4 before the holding force G2 is overcome, and, as indicated in the vector diagram shown in Fig. 6–*c*, such normal force G4 corresponds to a torque G5 which must be transmitted between the clutch parts before relative axial movement will occur therebetween. It is evident that with the steeper tangent T1 to the point of contact *f1* in Fig. 6–*c*, and with the same holding force G2, a greater torque G5 must be transmitted before the parts will move axially of one another than is necessary when the parts occupy the position illustrated in Fig. 6–*b*.

If it is assumed that any further relative axial movement of the roller 7 beyond the point of contact *f1* will bring the seal ring 66 out of sealing relation to the cylindrical valve seat 68, then torque transmitted through the primary clutch 11 which exceeds the value G5 will result in the reduction of the holding force to substantially zero, the primary clutch parts then rapidly moving to the fully released condition illustrated in Fig. 4, in which the driven member 25 is latched in the released condition by the detent pins 89.

The intervening rollers 7 will roll along the driving and driven clutch faces 22, 23, since the carrier 8 is free to turn or rotate on the hub 83 of the valve body closure member 60. The carrier 8 and the rollers are also movable axially since the carrier can slide along the hub 83 of the body closure member 60. Thus, the rollers are free to move arcuately of the driving and driven members and also axially with respect thereto, the movement of the primary clutch parts to a clutch releasing condition occurring by virtue of the rolling action of the rollers about their radial axes, there being very little, if any, sliding friction occurring between the parts.

Because of the concavity of the clutch faces 22, 23 on the driving and driven teeth, and the radius of curvature of these faces being substantially greater than the radius of curvature of each roller 7, a progressively greater torque is required for the same holding force G2 on the primary clutch, as the clutch elements separate from one another in moving toward a primary clutch released state. Assuming the apparatus to be applied to a threaded fastening element, as the latter is tightened, the torque transmitted increases, this torque acting through the clutch teeth and intervening rollers 21, 7, 24 and tending to shift the driven clutch member 25 in a forward direction out of engagement from the rollers 7 and carrying the rollers out of engagement with the driving clutch teeth 21. Such action is resisted by the holding force of the air pressure upon the valve head 64, and, to some extent, by the clutch reengaging spring 37, which, as stated above, is preferably made comparatively light so that its force is of minor significance.

When a predetermined torque or force is transmitted corresponding to the holding force of the air under pressure, the driven member 25 is shifted in a forward direction, but not necessarily to a released condition with respect to the rollers 7. The extent of movement depends upon the resistance encountered and the rate at which deceleration of the parts occurs, as tightening of the threaded fastening element proceeds. If the threaded fastening element comes to a sudden stop, such action might occur when the clutch teeth engage the rollers at points like *f* in Fig. 6–*b*. Such sudden stopping will cause the driven member 25 to be shifted fully forwardly very rapidly, to bring the valve head 64 out of engagement from the cylindrical seat 68, the clutch actually releasing at a torque corresponding to a relatively low value G3 corresponding to the holding force G2. However, the threaded fastening element will actually be tightened beyond the value corresponding to the torque G3, since the inertia forces are quite considerable when the threaded fastening element comes to a sudden stop, and such inertia forces provide an additional tightening to the threaded fastening element. The total torque to which the latter has been tightened is the sum of the static torque G3 corresponding to the holding force of the air under pressure against the valve head 64, plus a dynamic torque corresponding to the inertia of the parts and the impact to which the threaded fastening element is subjected when it comes to a sudden stop.

If it is assumed that the threaded fastening element encounters comparatively gradual torque resistance during its tightening (as compared to a sudden stop), the driven member 25 will be shifted by the torque transmitted axially away from the driving member 20, the rollers 7 moving outwardly along the faces 22, 23 of the clutch teeth 21, 24, the valve head 64 remaining engaged within the extended cylindrical valve seat 68. However, due to the partial axial shifting of the driven clutch teeth 24 in a forward direction with respect to the rollers 7 and of the rollers 7 with respect to the driving clutch teeth 21, the point of engagement between the rollers and the clutch faces shifts, as to the point *f1* shown in Fig. 6–*c*, at which the tangent T1 to the point of contact is steeper. Accordingly, as illustrated in Fig. 6–*c*, despite the fact that the same holding force G2 is acting on the valve head and tending to maintain the primary clutch 11 in engagement, the torque G5 corresponding to this holding force, and at which the holding force is overcome to release the clutch, is much greater. Accordingly, when the threaded fastening element is rotated and encounter gradually increasing resistance, the primary clutch actually fully releases at a higher torque value than was the case illustrated diagrammatically in Fig. 6–*b*, wherein a sudden stop was assumed. The static torque G5 of the threaded fastening element, which is being gradually tightened, is much greater than the static torque G3 of the other threaded fastening element that was stopped suddenly. The dynamic torque due to inertia forces is correspondingly lower under the gradual arresting or stopping of the threaded fastening element, inasmuch as such threaded fastening element and the moving parts of the driven clutch apparatus have been gradually decelerated. The sum of the torque, namely, the static torque, which is greater, and the dynamic torque, which is lesser, will still substantially equal the desired final torque to be imposed upon the threaded fastening element.

It is, accordingly, evident that the point of engagement of the rollers 7 with the faces 22, 23 of the driving and driven clutch teeth 21, 24 at the time that clutch release actually occurs will vary. The greater the dynamic torque, due to inertia forces, the lesser will be the slope of the tangent at the point of contact and the lesser will be the static torque. Conversely, the greater the static torque, due to the gradual imposition of this torque on the threaded fastening element and on the primary clutch parts, the lesser will be the dynamic torque, in view of the fact that the slope of the tangent at the point of contact increases as the clutch teeth separate, requiring a correspondingly greater static torque for the same holding force tending to keep the primary clutch elements coengaged.

The apparatus illustrated can operate effectively in both a forward and a rearward direction. If the forward driving faces 22, 23 of the driving and driven clutch teeth are made the same as the rearward driven faces **22*a*, 23*a* of the driving and driven clutch teeth, then the apparatus will release at the same torque values when rotated in a rearward direction as when rotated in a forward direction. This will be true when the rearward faces 22*a*, 23*a* of the clutch teeth have the same radius of curvature as the forward faces 22, 23 and the same axial extent. However, it may be desired to rotate the apparatus in a reverse direction and effect clutch release at a higher torque value than in a forward direction, for the same holding force or air pressure in the apparatus. This can be accomplished in several ways, as illustrated in the drawings. Thus, the axial extent of the rearward faces 22a, 23a of the clutch teeth can be made greater than that of the forward faces 22, 23, so that a tangent T2 to the point of contact between each roller and the rear faces 22a, 23a which it engages can assume a much steeper angle at the outer ends of the teeth, corresponding to a greater torque required to effect release of the primary clutch for the same holding force G2**, tending to hold the clutch in engagement. This condition is depicted in Figs. 7–*a, b, c*, in which Fig. 7–*a* illustrates the relative relation of a roller 7 with respect to the trailing or rear faces 22a, 23a of the clutch teeth with very little torque imposed on the apparatus, Fig. 7–*b* corresponding to Fig. 6–*b* and illustrating the condition as the torque is increased, and Fig. 7–*c* illustrating the condition in which a roller engages the outermost portions of the clutch faces, in which the tangent T2 is much steeper, requiring a much greater torque G6 to secure clutch release than is the case under the condition depicted in Fig. 6–*c*.

In the clutch tooth forms illustrated in Figs. 8 and 9, a greater torque is required to release the clutch when rotating in a reverse direction than in a forward direction. The positions illustrated in Figs. 8–*a, b, c* correspond to Figs. 6–*a, b, c*, respectively, the forward clutch faces 22, 23 of the driving and driven teeth 21, 24 having a greater radius of curvature than the roller 7. However, as illustrated in Fig. 9, the rearward clutch faces 22b, 23b have the same radius of curvature as the roller 7, and extend axially to the same extent as the forward faces 22, 23. With the lesser radius of curvature on the reverse faces 22b, 23b of the clutch teeth, the effective point of contact f5 between the roller 7 and each reverse or rear clutch face is at the outer end of the clutch tooth, and a tangent T5 drawn to the point of contact between the roller and the outer end of each clutch face makes a much steeper angle than a tangent T4 to the point of contact of the roller with the outer end of a forward clutch face (Fig. 8–*c*). Accordingly, a much greater torque will be required to effect clutch release with the concave clutch face 22b, 23b of much smaller radius of curvature shown on the rear faces of the clutch teeth in Figs. 9–*a, b, c*, than if the radius of curvature were greater. With the arrangement illustrated in Fig. 9, reverse rotation or loosening of the threaded fastening element will occur with the same holding force G2, but clutch release is prevented unless a much higher torque is transmitted to the apparatus. Ordinarily, such higher torque will not be reached, since the threaded fastening element will be loosened and rotated to a fully unthreaded condition, the torque transmitted actually decreasing considerably once loosening has been effected.

In the form of invention illustrated in Figs. 10–*a, b, c*, the forward and rearward faces 22d, 22e, 23d, 23e of the clutch teeth have the same radius of curvature as the roller 7. Torque release will occur with the same holding force G2 as in the condition illustrated in Fig. 9, for both a forward and a reverse direction of rotation of the apparatus. The same torque is required to release the clutch when operating in a forward direction as when operating in a reverse direction. However, until a predetermined torque is reached at which clutch release will occur, there is a full driving surface of contact between each clutch face 22d, 23d or 22e, 23e and the roller 7, which prevents a concentration of the driving effort along a line of contact, such as illustrated in Figs. 6, 7 and 8. Clutch release still occurs, with a rolling action being imparted between the clutch teeth 21, 24 and the rolling elements 7.

In the form of invention illustrated in Figs. 11 to 16, inclusive, ball rolling elements 7a are used between the driving and driven clutch members 20a, 25a, rather than the rollers 7 shown in Figs. 1 to 10, inclusive. The balls 7a are circumferentially spaced around the driving and driven members, being held in appropriate spaced relation within a carrier member 8a and being received within spherical sockets 21a, 24a in the end faces of the driving and driven members that are opposed to one another. These sockets have a radius of curvature which is substantially greater than the radius of each spherical rolling element or ball 7a, and will cooperate, in substantially the same manner as the roller forms of the invention previously described, with the concave forward and rearward driving faces 22g, 22h, 23g, 23h of each spherical socket in effecting clutch release at a gradually increasing torque value for the same holding force. As shown diagrammatically in Fig. 13, there is substantially no torque being transmitted through the ball 7a, and it is making substantially point contact f7 with the innermost part of each socket 21a, 24a. As the torque transmitted increases, a partial separation between the parts 20a, 25a occurs, the ball or sphere 7a making contact at the point f8 in the face 22g, 23g of each socket. The tangent T7 drawn to the sphere at this point of contact f8 makes a relatively shallow angle and requires a particular torque, corresponding to the holding force G2, before further separation or primary clutch release will occur.

As shown in Fig. 15, the parts 20a, 25a have separated to a still greater extent, the sphere or ball 7a now making contact at the outer portion of each clutch face 22g, 23g at which the tangent T8 to the sphere at the point of contact is much steeper than the tangent T7 shown in Fig. 14. Accordingly, a much greater torque will be required for the same holding force G2 to effect clutch release.

Finally, Fig. 16 illustrates the fully released condition of the clutch device, the driven member 25a being latched in its released condition and the primary clutch thereby being maintained in its disengaged condition. The driving member 20a can continue to rotate, but the driven member 25a will now be stationary. The balls 7a may move back into either the driving member sockets 21a or the driven member sockets 24a, as the case may be. They will remain stationary if shifted back into the driven member sockets, or they will rotate with the driving member if moved back into the driving member sockets 21a.

It is, accordingly, apparent that a torque releasable device has been provided which automatically compensates for the inertia forces, and does so with a minimum of friction. Instead of sliding friction, as would be present when clutch teeth engage one another directly, only rolling friction is involved, since the rollable elements, whether balls or rollers, will roll over the companion faces of the driving and driven clutch teeth, rather than sliding thereon. The clutch is self-adjusting, so that the threaded fastening element is tightened to the desired torque value regardless of the rate at which deceleration of the threaded fastening element occurs. The clutch faces themselves are comparatively economical to manufacture, since they all lie on circular or spherical surfaces which are comparatively easy to generate. If desired, the torque required to effect clutch release for the same holding force when the primary clutch rotates in a reverse direction can be made greater than when the clutch rotates in a forward direction.

The inventor claims:

1. In torque releasable clutch apparatus: a driving member having concave driving clutch faces lying on circular arcs; a driven member having concave driven clutch faces lying on circular arcs; rollable elements engaging said faces to transmit torque between said members; and means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said faces being substantially greater than the radius of curvature of said rollable elements.

2. In torque releasable clutch apparatus: a driving member having concave driving clutch faces lying on circular arcs; a driven member having concave driven clutch faces lying on circular arcs; a carrier rotatably and axially movable relative to said driving and driven members; rollable elements on said carrier engaging said faces to transmit torque between said members; and means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said faces being substantially greater than the radius of curvature of said rollable elements.

3. In torque releasable clutch apparatus: a driving member having concave driving clutch faces lying on circular arcs; a driven member having concave driven clutch faces lying on circular arcs; a carrier rotatably and axially movable relative to said driving and driven members; radially arranged rollers rotatably mounted on said carrier and engaging said faces to transmit torque between said members; and means exerting a holding force on said members and rollers tending to maintain said rollers in engagement with said faces while enabling said members and rollers to shift axially with respect to each other toward a position in which at least one of said members is disengaged from said rollers to disrupt the drive between said members; the radius of curvature of said faces being substantially greater than the radius of curvature of said rollers.

4. In torque releasable clutch apparatus: a driving member having concave driving clutch faces lying on circular arcs; a driven member having concave driven clutch faces lying on circular arcs; a carrier rotatably and axially movable relative to said driving and driven members; balls on said carrier engaging said faces to transmit torque between said members; and means exerting a holding force on said members and balls tending to maintain said balls in engagement with said faces while enabling said members and balls to shift axially with respect to each other toward a position in which at least one of said members is disengaged from said balls to disrupt the drive between said members; the radius of curvature of said faces being substantially greater than the radius of curvature of said balls.

5. In torque releasable clutch apparatus: a driving member having concave forward and rearward driving clutch faces lying on circular arcs; a driven member having concave forward and rearward driven clutch faces lying on circular arcs; rollable elements engaging said forward and rearward faces to transmit torque between said members in either a forward or reverse direction; and means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said faces being greater than the radius of curvature of said rollable elements; said rearward faces having a greater axial extent than said forward faces.

6. In torque releasable clutch apparatus: a driving member having concave forward and rearward driving clutch faces lying on circular arcs; a driven member having concave forward and rearward driven clutch faces lying on circular arcs; rollable elements engaging said forward and rearward faces to transmit torque between said members in either a forward or reverse direction; and means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said forward faces being greater than the radius of curvature of said rollable elements; the radius of curvature of said rearward faces being substantially equal to the radius of curvature of said rollable elements.

7. In torque releasable clutch apparatus: a driving member having concave forward and rearward driving clutch faces lying on circular arcs; a driven member having concave forward and rearward driven clutch faces lying on circular arcs; a carrier rotatably and axially movable relative to said driving and driven members; rollable elements on said carrier engaging said forward and rearward faces to transmit torque between said members in either a forward or reverse direction; and means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said faces being greater than the radius of curvature of said rollable elements; said rearward faces having a greater axial extent than said forward faces.

8. In torque releasable clutch apparatus: a driving member having concave forward and rearward driving clutch faces lying on circular arcs; a driven member having concave forward and rearward driven clutch faces lying on circular arcs; a carrier rotatably and axially movable relative to said driving and driven members; radially arranged rollers rotatably mounted on said carier and engaging said faces to transmit torque between said members in either a forward or reverse direction; and means exerting a holding force on said members and rollers tending to maintain said rollers in engagement with said faces while enabling said members and rollers to shift axially with respect to each other toward a position in which at least one of said members is disengaged from said rollers to disrupt the drive between said members; and the radius of curvature of said faces being greater than the radius of curvature of said rollers; said rearward faces having a greater axial extent than said forward faces.

9. In torque releasable clutch apparatus: a driving member having concave forward and rearward driving clutch faces lying on circular arcs; a driven member having concave forward and rearward driven clutch faces lying on circular arcs; rollable elements engaging said forward and rearward faces to transmit torque between said members in either a forward or reverse direction; means exerting a holding force on said members and elements tending to maintain said elements in engagement with said faces while enabling said members and elements to shift axially with respect to each other toward a position in which at least one of said members is disengaged from said rollable elements to disrupt the drive between said members; the radius of curvature of said faces being greater than the radius of curvature of said rollable elements; said rearward faces having a greater axial extent than said forward faces; and means for releasably securing said members and rollable elements in relative positions wherein said drive between said members is disrupted.

10. In torque releasable clutch apparatus: a driving member having concave forward and rearward driving clutch faces lying on circular arcs; a driven member having concave forward and rearward driven clutch faces lying on circular arcs; a carrier rotatably and axially movable relative to said driving and driven members;

radially arranged rollers rotatably mounted on said carrier and engaging said faces to transmit torque between said members in either a forward or reverse direction; means exerting a holding force on said members and rollers tending to maintain said rollers in engagement with said faces while enabling said members and rollers to shift axially with respect to each other toward a position in which at least one of said members is disengaged from said rollers to disrupt the drive between said members; the radius of curvature of said faces being greater than the radius of curvature of said rollers; said rearward faces having a greater axial extent than said forward faces; and means for releasably securing said members and rollers in relative positions wherein said drive between said members is disrupted.

References Cited in the file of this patent

UNITED STATES PATENTS

| | | |
|---|---|---|
| 2,127,855 | Baumgratz et al. | Aug. 23, 1938 |
| 2,732,746 | Livermont | Jan. 31, 1956 |
| 2,741,352 | Stevens et al. | Apr. 10, 1956 |
| 2,750,020 | Rice et al. | June 12, 1956 |
| 2,760,361 | Ruthinger | Aug. 28, 1956 |
| 2,835,365 | Rice et al. | May 20, 1958 |

FOREIGN PATENTS

| | | |
|---|---|---|
| 333,694 | Great Britain | Aug. 21, 1930 |